(12) United States Patent
De Haas et al.

(10) Patent No.: US 9,869,534 B2
(45) Date of Patent: Jan. 16, 2018

(54) BALLISTIC RESISTANT ARTICLE AND PROCESS TO MANUFACTURE SAID ARTICLE

(71) Applicants: TEIJIN ARAMID B.V., Arnhem (NL); BARRDAY INC., Cambridge (CA)

(72) Inventors: Marc-Jan De Haas, Apeldoorn (NL); Alex Van Norel, Duiven (NL); Vincent Van Bommel, Zevenaar (NL); Nektarios Poulopoulos, Petersburg (CA); Alicia Williams, Huntersville, NC (US)

(73) Assignees: TEIJIN ARAMID B.V., Arnhem (NL); BARRDAY INC., Cambridge (CA)

( * ) Notice: Subject to any disclaimer, the term of this patent is extended or adjusted under 35 U.S.C. 154(b) by 361 days.

(21) Appl. No.: 14/767,371

(22) PCT Filed: Mar. 21, 2014

(86) PCT No.: PCT/EP2014/055735
§ 371 (c)(1),
(2) Date: Aug. 12, 2015

(87) PCT Pub. No.: WO2014/154587
PCT Pub. Date: Oct. 2, 2014

(65) Prior Publication Data
US 2016/0018193 A1 Jan. 21, 2016

(30) Foreign Application Priority Data
Mar. 26, 2013 (EP) .................................... 13161130

(51) Int. Cl.
*F41H 5/04* (2006.01)
*B32B 5/02* (2006.01)
(Continued)

(52) U.S. Cl.
CPC ........... *F41H 5/0478* (2013.01); *B32B 5/022* (2013.01); *B32B 5/024* (2013.01); *B32B 5/26* (2013.01);
(Continued)

(58) Field of Classification Search
CPC ................ C07D 471/04; C07D 519/00; B32B 2260/021; B32B 2260/046;
(Continued)

(56) References Cited

U.S. PATENT DOCUMENTS

2002/0037391 A1 3/2002 Harpell et al.
2006/0286880 A1 12/2006 Termonia

FOREIGN PATENT DOCUMENTS

WO 2012/098158 A1 7/2012

OTHER PUBLICATIONS

Jul. 23, 2014 International Search Report issued in International Patent Application No. PCT/EP2014/055735.
(Continued)

*Primary Examiner* — Arti Singh-Pandey
(74) *Attorney, Agent, or Firm* — Oliff PLC

(57) ABSTRACT

A ballistic resistant article is provided along with a process to manufacture the article. The ballistic resistant articles includes at least one consolidated composite, wherein the at least one consolidated composite includes at least two layers, each layer includes a network of fibers, the fibers have a strength of at least 800 mN/tex (1100 MPa) according to ASTM D 7269-07, the fibers in each layer are impregnated with a matrix material, and each consolidated composite has a front surface and a rear surface. In the ballistic article, at least the front surface of each consolidated composite is powder coated with partly molten and solidified powder particles to form a powder coated surface.

16 Claims, 1 Drawing Sheet

(51) Int. Cl.
 B32B 5/26 (2006.01)
 B32B 37/14 (2006.01)
(52) U.S. Cl.
 CPC ........... *B32B 37/14* (2013.01); *F41H 5/0485* (2013.01); *B32B 2260/021* (2013.01); *B32B 2260/046* (2013.01); *B32B 2262/0269* (2013.01); *B32B 2264/0242* (2013.01); *B32B 2264/0257* (2013.01); *B32B 2571/02* (2013.01)
(58) Field of Classification Search
 CPC .... B32B 2262/0269; B32B 2264/0242; B32B 2264/0257; B32B 2571/02; B32B 37/14; B32B 5/022; B32B 5/024; B32B 5/26; F41H 5/0478; F41H 5/0485
 See application file for complete search history.

(56) References Cited

OTHER PUBLICATIONS

Jul. 23, 2014 Written Opinion issued in International Patent Application No. PCT/EP2014/055735.

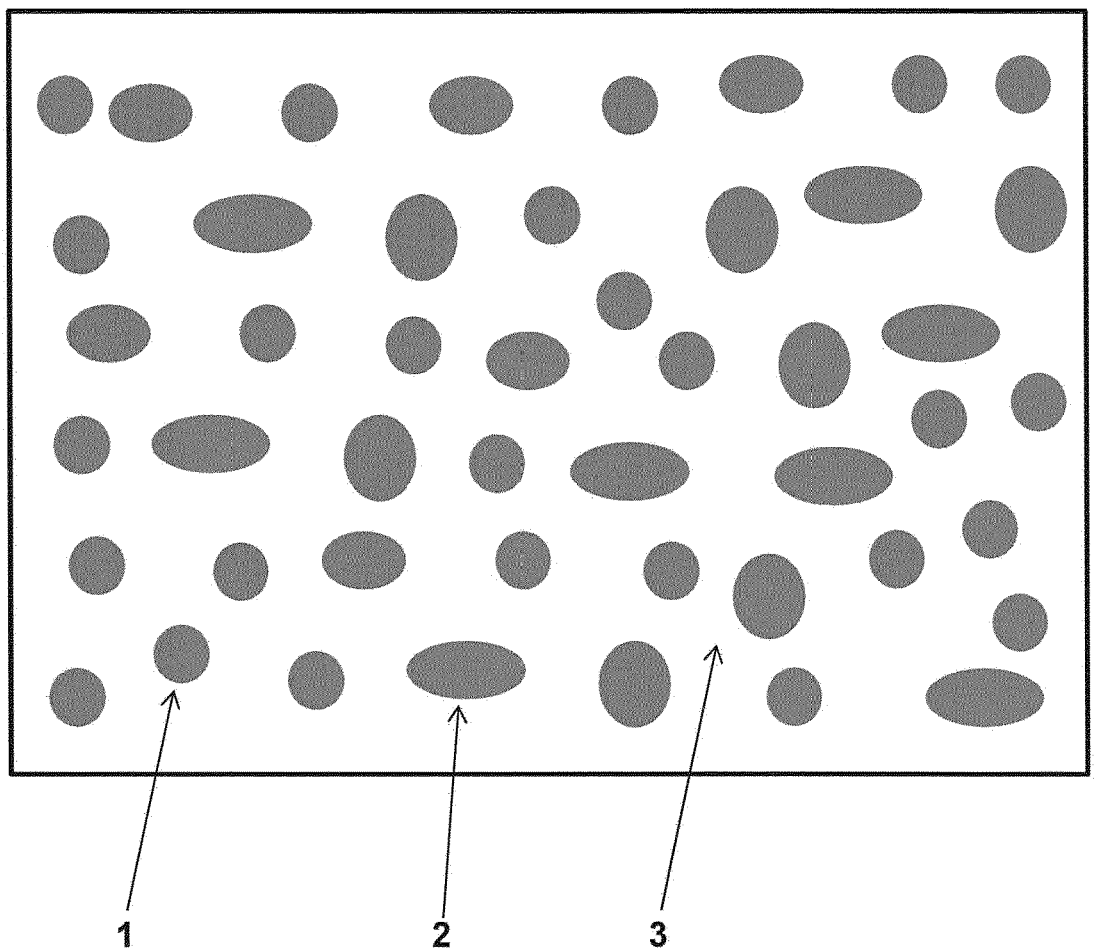
1  2  3

BALLISTIC RESISTANT ARTICLE AND PROCESS TO MANUFACTURE SAID ARTICLE

BACKGROUND

The present application pertains to a ballistic resistant article and to a process to manufacture said article.

Ballistic articles which comprise composites are known. The composites comprise layers of fibrous materials. Said layers of fibrous materials are coated with a polymeric binder material, also known as polymeric matrix material. Furthermore, it is known to laminate one or both of the surfaces of the composites described before with a polymer film resulting in a ballistic resistant article exhibiting on one or on both of its surfaces said polymer film. Such ballistic resistant articles exhibits a high penetration resistance against a ballistic attack quantified by the $v_{50}$-value which is determined under specified conditions and means the velocity of the used ammunition in m/s at which 50% of the ammunition does not penetrate the article.

However, there is an everlasting demand for ballistic resistant articles which at the same areal density exhibit both against bullet ammunition and fragment ammunition a higher $v_{50}$-value than ballistic articles as described in the above paragraph.

Therefore, the problem underlying the present application is to provide a ballistic resistant article which at the same areal density exhibits a higher $v_{50}$-value both against bullet ammunition and fragment ammunition than a ballistic article as described in the first paragraph.

SUMMARY

Said problem is solved by a ballistic resistant article comprising at least one consolidated composite, wherein
  the at least one consolidated composite comprises at least two layers,
  each layer comprises a network of fibers,
  the fibers have a strength of at least 800 mN/tex (1100 MPa) according to ASTM D 7269-07,
  the fibers in each layer are impregnated with a matrix material, and
  each consolidated composite has a front surface and a rear surface, characterized in that
  at least the front surface of each consolidated composite is powder coated with partly molten and solidified powder particles to form a powder coated surface.

BRIEF DESCRIPTION OF THE DRAWING

FIG. 1 is a top view of an example coating pattern of the powder coating for the ballistic resistant article.

DETAILED DESCRIPTION

Surprisingly, the ballistic resistant article according to the present application at the same areal density exhibits a higher $v_{50}$-value both against bullet ammunition and fragment ammunition than a comparative ballistic article which differs from the inventive ballistic article only in that it exhibits a polymer film on one or both of its surfaces and not—as the inventive article—a surface which is powder coated with partly molten and solidified powder particles.

It is even more surprising, that in preferred embodiments shown in the examples the ballistic resistant article according to the present application even at a slightly lower areal density than that of the comparative article described in the above paragraph exhibits a higher $v_{50}$-value both against bullets and fragment ammunition than the comparative article.

Furthermore, it is surprising, that in preferred embodiments shown in the examples the ballistic resistant article according to the present application exhibits a considerably increased stability against abrasion if compared with a comparison ballistic resistant article which exhibits on its surface a polymer film instead of a powder coated surface consisting of partly molten and solidified powder particles: While the powder-coated surface of the inventive ballistic resistant article shows only little change and no fiber bundling so that the UD-layer arranged below the outer UD-layer remains invisible, the film of the film-coated surface of the comparison ballistic resistant article is worn off of the outer UD-layer and fibers of said outer UD-layer begin to bundle. Fiber bundling is so intensive that the UD-layer arranged below the outer UD-layer of the comparison ballistic resistant article becomes visible.

In a preferred embodiment of the ballistic resistant article according to the present application, the partly molten and solidified powder particles form an island in the sea coating pattern on the powder coated surface.

Within the scope of the present application, the phrase "consolidated composite comprises at least two layers" means that at least two layers are necessary to form said composite and that said at least two layers have been stacked on one another and thereafter consolidated, i.e., bonded to one another.

The ballistic resistant article according to the present application exhibits the surprising effects described above even in an embodiment, wherein said article comprises only one consolidated composite which comprises only two layers.

The skilled person who knows the present application and who shall provide a ballistic resistant article according to the present application for a desired level of ballistic protection will select an appropriate number of consolidated composites. For frequently desired levels of ballistic protection said number of consolidated composites ranges from 2 to 100. Therefore, in a preferred embodiment of the ballistic resistant article according to the present application, the article comprises 2 to 100 consolidated composites, more preferred 2 to 50 consolidated composites, and especially preferred 10 to 45 consolidated composites.

Furthermore, the skilled person who knows the present application and who shall provide a ballistic resistant article according to the present application for a desired level of ballistic protection will select an appropriate number of layers for the at least one consolidated composite. For frequently desired levels of ballistic protection said number of layers ranges from 2 to 10. Therefore, in a preferred embodiment of the ballistic resistant article according to the present application, each consolidated composite consists of 2 to 10 layers, more preferred of 2 to 6 layers, and especially preferred of 2 to 4 layers.

Within the scope of the present application, the phrase "each layer comprises a network of fibers" means that each layer comprises a textile fabric comprising fibers arranged relative to one another in a certain manner which is characteristic for said textile fabric. Preferably, the fibers are arranged relative to one another
  in a woven manner or
  in a non-woven manner, like in a felt, but more preferred in a configuration, wherein the fibers are unidirectional aligned relative to one another.

Therefore, in a preferred embodiment of the ballistic resistant article according to the present application, the network of fibers comprised by each layer is a woven fabric or a non-woven fabric, and the non-woven fabric preferably is a unidirectional aligned fiber layer.

Within the scope of the present application, the term "fibers" means an elongate body, the length dimension of which is much greater than the transverse dimensions of width and thickness. Accordingly, "fibers" includes monofilament fibers, multifilament fibers, ribbons, strips, staple fibers and yarns made from one or more of the foregoing, for example multifilament yarns or staple fiber yarns. Especially preferred "fibers" mean multifilament yarns. The cross-sections of the "fibers" to be used in the present application may vary widely. They may be circular, flat or oblong in cross-section. They also may be of irregular or regular shape having one or more regular or irregular lobes projecting from the longitudinal axis of, e.g., a filament. Preferably the "fibers" exhibit a substantially circular cross-section.

The fibers comprised by the network of fibers have a strength of at least 800 mN/tex (1100 MPa) according to ASTM D 7269-07, and preferably are aramid fibers.

Within the scope of the present application, the term "aramid fibers" means fibers produced from an aromatic polyamide as the fiber-forming polymer. In said fiber forming polymer at least 85% of the amide (—CO—NH—) bonds are directly bound on two aromatic rings. Especially preferred aromatic polyamides are p-aramids. Among the p-aramids poly(p-phenylene terephthalamide) is the most preferred one. Poly(p-phenylene terephthalamide) results from the mol:mol polymerization of p-phenylene diamine and terephthalic acid dichloride. Fibers consisting, e.g., of multifilament yarns made from poly(p-phenylene terephthalamide) can be obtained under the trade name Twaron® from Teijin Aramid (NL).

The fibers in each layer comprised by the network of fibers are impregnated with a matrix material. In a preferred embodiment of the ballistic resistant article according to the present application the matrix material comprises an organic polymer and the polymer is a styrene isoprene styrene block copolymer, a styrene butadiene random copolymer, a self-crosslinking acrylic polymer and/or a crosslinkable acrylic polymer or a polychloroprene polymer. Within the scope of the present application the term "self-crosslinking acrylic polymer" means a polyacrylate having self-reactive sites built into the acrylic polymer chain that will crosslink at elevated temperatures. Thereby said self-reactive groups of adjacent polymer chains react with one another and chemically bind said adjacent polymer chains to form a cross-linked polymer. To speed the crosslinking reaction an acid or latent acid catalyst may be added.

Within the scope of the present application, the term "crosslinkable acrylic polymer" means an acrylic polymer, preferably an acrylic homopolymer, which does not exhibit self-reactive groups and therefore, needs the addition of an external crosslinking agent, such as a nitrogenous thermosetting resin to achieve the optionally desired crosslinking reaction.

In a preferred embodiment of the ballistic resistant article according to the present application, the matrix material comprises a tackifier. Within the scope of the present application, the term "tackifier" means a chemical compound preferably present in the matrix material of the ballistic resistant article according to the present application and being homogenously distributed in said matrix material, thereby providing the matrix material with tack. And within the scope of the present application, the term "homogeneously distributed in said matrix material" means that the concentration of the tackifier in every volume element of the matrix material is the same.

In a preferred embodiment of the ballistic article according to the present application, the tackifier is selected from the group consisting of
rosin resins which are derived from either tree stumps (wood resin), sap (gum rosin) or by-products of the paper making process (tall oil rosin),
  wherein the rosin resins may be
  rosin esters obtained by the reaction between rosin acids and alcohols,
  hydrogenated rosin esters obtained by hydrogenation of the rosin acid raw material or
  dimerized rosin resins obtained from dimerizing rosin acids or
terpene resins derived from terpene feedstocks either from wood sources or from citrus fruit, or
hydrocarbon resins available from Neville Chemical Company, US under several designations, such as NP-10, NP-25 and FN-175.

In a preferred embodiment of the ballistic article according to the present application, the tackifier is present in the matrix material in a weight percentage with respect to the weight of the matrix material ranging from 1 wt.-% to 20 wt.-%, more preferred from 1.5 wt.-% to 10 wt.-% and most preferred from 2 wt.-% to 6 wt.-%. If said weight percentage of the tackifier is below 1 wt.-% and if the network of fibers is a unidirectional aligned fiber layer handling of a single layer of unidirectional aligned fibers during the manufacture of the composite may become more complicated. If said weight percentage of the tackifier is above 20 wt.-%, the composite, and consequently the ballistic article of the present application may become too stiff.

In an especially preferred embodiment of the ballistic article of the present application, the tackifier is an abietic acid or a rosin ester which is for example contained in Aquatac® 6025, a waterborne dispersion containing about 58 wt.-% rosin ester, about 39 wt.-% water and less than 4 wt.-% surfactant from Arizona Chemical, US.

The fibers in each layer comprised by the network of fibers are impregnated with a matrix material in a matrix material content. The matrix material is present on the impregnated fibers in a weight-percentage which is sufficient to bond and thereby consolidate the at least two layers to one another and thereby to yield a consolidated composite. Therefore, it is not necessary that each and every space between the fibers of the network of fibers is filled with the matrix material, provided that the applied quantity of the matrix material enables a sufficient binding of the at least two layers to one another. For example, the matrix material may be distributed in spots on and between the fibers of the network of fibers. Therefore, the matrix material content in each layer and in each consolidated composite of the ballistic resistant article according to the present application preferably ranges from 5 wt.-% to 30 wt.-% with respect to the weight of the fibers without moisture, especially preferred from 10 wt.-% to 25 wt.-% with respect to the weight of the yarn without moisture, i.e., dried to a water content well below 0.5 wt.-%, and an areal density of each consolidated composite preferably ranges from 50 $g/m^2$ to 500 $g/m^2$, especially preferred from 75 $g/m^2$ to 300 $g/m^2$.

Within the scope of the present application, the phrase "at least the front surface of each consolidated composite comprised by the ballistic resistant article according to the present application is powder coated with partly molten and solidified powder particles to form a powder coated surface, and preferably the partly molten and solidified powder particles form an island-in-the-sea coating pattern on the powder coated surface" means that the powder coated surface, when looked from above exhibits a coating pattern which preferably consists of islands of partly molten and solidified powder particles in a sea which is the area of the powder coated surface which is not covered by said islands. Though it might occur that very few of the islands contact one another, preferably at least 20% and most preferred 100% of the islands do not contact one another. So, the island-in-the-sea coating pattern can immediately be distinguished from a film which continuously covers the whole film-coated surface.

The shape of the island depends on the shape of the powder particles which have been used and from the conditions under which said particles have been partly molten and thereafter solidified to form said island-in-the-sea coating pattern on the powder coated surface. Within the scope of the present application the term "partly molten and solidified powder particles" means that the particles have been molten only to such an extent that they adhere sufficiently on the surface of the coated layer. Because in the present application said surface consist of matrix material impregnated fibers, this means that the partly molten particles in the partly molten state flowed at least partly or completely around the matrix material impregnated fibers and, therefore, after solidification adhere to the matrix material impregnated fibers. Furthermore, "solidified powder particles" means that the partly molten particles have been cooled to room temperature and then are solid and hard enough so that their shape is not significantly deformed, if during use of the ballistic resistant article according to the present application adjacent powder coated layers of composites move relative to one another. If looked from the side, the solidified powder particles exhibit a shape having a height which is somewhat lower than the diameter of the particles before the partly melting procedure and exhibiting a contact angle with respect to the powder coated surface far above 0°, preferably in the range from 10° to 90°.

In a preferred embodiment of the ballistic resistant article according to the present application, the powder particles consist of a thermoplastic polymer, wherein the thermoplastic polymer preferably has an number average molecular weight $M_n$>14000 g/mol and a glass transition temperature $T_g$>85° C., and wherein the thermoplastic polymer preferably is a member selected from one of the groups consisting of high density polyethylenes (HDPE), low-density polyethylenes (LDPE), linear low-density polyethylenes (LLDPE) and polyvinyl chlorides (PVC). Preferably, the HDPE, LDPE and the LLDPE exhibit a weight averaged molecular weight $M_w$>65 000 g/Mol and a number averaged molecular weight $M_n$>14 000. In an especially preferred embodiment of the ballistic resistant article according to the present application, the LDPE and the LLDPE exhibit a weight averaged molecular weight $M_w$>80 000 g/Mol and a number averaged molecular weight $M_n$>16 000.

In a further preferred embodiment of the ballistic resistant article according to the present application, the powder particles consist of a thermoplastic polymer, wherein the thermoplastic polymer preferably has an number average molecular weight $M_n$>14000 g/mol and a glass transition temperature $T_g$>85° C., and wherein the thermoplastic polymer preferably is a member selected from one of the groups consisting of linear or branched polypropylenes, random copolymers of ethylene and propylene, block copolymers of polyethylene blocks and polypropylene blocks, random copolymers of ethylene and an olefine, e.g., octene or butene, block copolymers of polyethylene blocks and an olefine, e.g., octene or butene, random copolymers of ethylene and vinylacetate, block copolymers of polyethylene blocks and polyvinylacete blocks, random copolymers of ethylene and an alkylacrylate, block copolymers of polyethylene blocks and polyalkylacrylate blocks, random copolymers of ethylene and acrylic acid, and block copolymers of polyethylene blocks and polyacrylic acid blocks.

As already mentioned only very few or most preferred none of the islands in the islands-in-the-sea coating pattern contact one another. Consequently, relatively low areal densities of the partly molten and solidified powder particles are used. In a preferred embodiment of the ballistic resistant article according to the present application, an areal density of the partly molten and solidified powder particles on a powder coated surface ranges from 0.1 g/m² to 50 g/m², more preferred from 1 g/m² to 50 g/m², even more preferred from 1 g/m² to 10 g/m², and especially preferred from 2 g/m² to 5 g/m².

In a preferred embodiment of the ballistic resistant article according to the present application, the islands in the island-in-the-sea coating pattern do not contact one another, and, if looked from above, exhibit a spherical and/or elliptical shape. Such a coating pattern is schematically shown in FIG. 1, wherein an island-in-the-sea coating pattern is shown exhibiting spherical islands 1 and elliptical islands 2 on the sea 3, i.e., the uncoated portion of the powder coated surface of a composite comprised by the ballistic resistant article according to the present application.

In a further preferred embodiment of the ballistic resistant article according to the present application, the spherical shaped islands have an arithmetically averaged diameter $d_s$ and the elliptical shaped island have an arithmetically averaged diameter $d_e$ obtained from arithmetically averaging the lengths of the long axes and of the short axes of the ellipses, so that the islands,
  when looked from above, exhibit an average diameter $d_i=(d_s+d_e)/2$, and $d_i$ ranges preferably from 10 to 10000 μm, especially preferred from 100 to 1000 μm, and
  when looked from the side, exhibit an arithmetically averaged height h, and h ranges preferably from 0.5 to 1000 μm, especially preferred from 5 to 50 μm.

In a further preferred embodiment of the ballistic resistant article according to the present application, the islands cover a fraction of the powder coated surface defined by a cover factor $f_c=\{(A_{covered}/(A_{covered}+A_{uncovered}))\}\cdot 100$ [%], wherein $A_{uncovered}$ denotes the uncovered area of the powder coated surface and $A_{covered}$ denotes the covered area of the powder coated surface, and $f_c$ ranges preferably from 1% to 95%, especially from 15% to 65%.

Furthermore, the present application provides a process to manufacture the ballistic resistant article according to the present application. Said process comprises the following steps.

a) Manufacturing at least one consolidated composite which comprises at least two layers, each layer comprises a network of fibers, the fibers have a strength of at least 800 mN/tex (1100 MPa) according to ASTM D 7269-07, and the fibers in each layer have been impregnated with a matrix material, which optionally comprises a tackifier, b) powder coating at least one surface of the consolidated composite resulting from step a) with powder particles by
  (1) distributing the powder particles on the surface,
  (2) partly melting the distributed particles resulting from step b(1) on the surface, and (3) solidifying the partly molten particles resulting from step b(2) on the surface, c) stacking the two or more powder coated consolidated composites obtained in step b) and fixating the consolidated composites with one another by stitching them at the corners.

In the above process, the terms "consolidated composite", "network of fibers", "matrix material", "tackifier", "fibers", and "powder particles" analogously have the same meaning as already explained for the ballistic resistant article according to the present application.

In step a) of the process according to the present application, a selected network of fibers is provided, especially coated, with a selected matrix material, wherein said matrix material preferably comprises an organic polymer and—optionally—a tackifier. This results in a first single layer comprising a network of fibers provided, especially coated with the matrix material and optionally a tackifier. In a preferred embodiment of step a) the fibers are aramid fibers. In a further preferred embodiment of step a) the network of fibers is a unidirectional aligned fiber layer. In an especially preferred embodiment of step a) the first single layer is obtained by coating unidirectional aligned aramid fibers with a matrix material and optionally a tackifier.

In the same manner as described above at least one further layer is manufactured, i.e., for example a second layer is manufactured.

Said at least one further layer is stacked on the first layer. If said first and said at least one further layer are unidirectional aligned fiber layers, said at least one further unidirectional fiber layers are cross-plied at a cross-plying angle, preferably at 90°, onto the first unidirectional aligned fiber layer to yield a cross-ply containing at least two layers of unidirectional aligned fibers which are provided with the matrix material, wherein the matrix material comprises a polymer, and—optionally—a tackifier.

Said composite, e.g., said cross-ply, is consolidated with the aid of a consolidation procedure yielding a consolidated composite. Preferably the consolidation procedure comprises applying a consolidation pressure $p_c$, a consolidation temperature $T_c$, and a consolidation time $t_c$, wherein $p_c$ ranges from 0.05 bar to 10 bar, $T_c$ ranges from 70 to 200° C., and $t_c$ ranges from 1 to 300 seconds. In an especially preferred embodiment of the process according to the present application the consolidation procedure of step a) is performed with $p_c$ ranging from 0.05 bar to 5 bar, $T_c$ ranging from 80 to 130° C., and $t_c$ ranging from 5 to 30 seconds.

In a preferred embodiment of the process according to the present application, in step b(1) dry powder particles are distributed on the surface with the aid of a distributing means. Preferably the distributing means is a powder coating apparatus.

In step b(2) of the process according to the present application, the distributed particles are partly molten. This means that the particles are softened to an extent which is sufficient that the softened particles flow on and around the matrix material impregnated fibers. However said softening extent is too low to enable the particles to melt completely on the matrix material impregnated fibers. Rather, the partly molten powder particles, if looked from the side, exhibit a shape having a height which is somewhat lower than the diameter of the particle before the partly melting procedure and exhibit a contact angle with respect to the powder coated surface far above 0°, preferable in the range from about 10° to about 90°.

In step b(3) of the process according to the present application, the partly molten particles resulting from step b(2) are solidified on the surface and thereby fixated with the matrix material impregnated fibers.

Preferably, the operations (1), (2) and (3) have to be performed in a manner that ensures that an island-in-the-sea coating pattern is obtained on the powder coated surface, and that preferably none of the islands contact one another. Once a powder coating material has been selected, one skilled in the art either knows the parameter set of the required manner of powder coating or at least can determine missing information of said parameter set with routine experiments.

If the ballistic resistant articles according to the present application comprises more than one consolidated composite, i.e., if in the process according to the present application step c) is practiced, it was found necessary to fixate the consolidated composites with one another by stitching them only at the corners, so that the composites can only move slightly relative to one another under the deformation of the ammunition.

Furthermore, the ballistic resistant article of the present application can be manufactured by an alternative process, which is also part of the present application, wherein said further process comprises the following steps:

a) Providing at least a first layer, wherein the first layer comprises a network of fibers, wherein the fibers have a strength of at least 800 mN/tex (1100 MPa) according to ASTM D 7269-07, and wherein the fibers are impregnated with a matrix material, which preferably comprises an organic polymer and optionally a tackifier, b) powder coating one surface of the first layer provided in step a) with powder particles by
  i) distributing the powder particles on the first layer,
  ii) partly melting the distributed powder particles on the first layer to yield partly molten powder particles on the first layer, which preferably do not contact one another,
  iii) if necessary, increasing the adhesion of the partly molten particles to the matrix material impregnated fibers of the network of fibers which form the surface of the first layer, and
  iv) solidifying the partly molten particles to obtain a first layer which preferably exhibits on one of its surfaces an islands-in-the-sea coating pattern, wherein the islands consist of partly molten and solidified particles, and wherein preferably the islands do not contact one another, c) providing at least a second layer, wherein the second layer comprises a network of fibers, wherein the fibers have a strength of at least 800 mN/tex (1100 MPa) according to ASTM D 7269-07, and wherein the fibers are impregnated with a matrix material which preferably comprises an organic polymer and optionally a tackifier, and powder coating the second layer in the same manner as described in step b) to obtain a second layer which preferably exhibits on one of its surfaces an islands-in-the-sea coating pattern, wherein the islands consist of partly molten and solidified particles, and wherein preferably the islands do not contact one another, d) binding the first layer obtained in step b) with the second layer obtained in step c) via their surfaces which were not powder coated to obtain a consolidated composite which preferably exhibits on both of its outer surfaces an islands-in-the-sea coating pattern, wherein the islands consist of partly molten and solidified particles, and wherein the islands preferably do not contact one another, e) manufacturing a plurality of consolidated composites as described in steps a) to d),
f) stacking the plurality of powder coated consolidated composites obtained in step e) and fixating the consolidated composites with one another by stitching them, preferably at the corners.

The application will be described in more detail in the following (comparative) examples.

COMPARATIVE EXAMPLE 1 a) Manufacture of a Single Unidirectional Fibrous Layer (1L-UD)

Poly(p-phenylene terephthalamide) multifilament yarns (Twaron type 2000; 1100 dtex f1000; Manufacturer: Teijin Aramid, NL) were taken from a creel and passed through a reed thus aligned substantially parallel to one another. The substantially parallel aligned yarns were coated using a kiss roll with Prinlin™ B7137 HV (glass transition temperature $T_g = -40$ to $-50°$ C. as the matrix material (Manufacturer: Henkel, Germany, i.e., with an aqueous dispersion of a styrene isoprene styrene block-copolymer containing abietic acid as tackifier. The Prinlin™ B7137 HV coated yarns were laid up on a silicone coated release paper and subsequently dried on a hot-plate set at a temperature of 120° C. resulting in a single unidirectional fibrous layer (1L-UD). The resin concentration in the 1L-UD was 17.2±1 wt.-% based on the total weight of the 1L-UD, i.e., with respect to the weight of the yarn without moisture, i.e., the weight of the 1L-UD dried to a water content of well below 0.5 wt.-%. From a practical point of view this means drying to a water content of zero wt.-%. The areal density of the poly(p-phenylene terephthalamide) multifilament yarns in the 1L-UD was 45±5 g/m². The total areal density of the 1L-UD including equilibrium moisture content of the 1L-UD was 55±5 g/m² depending on resin loading and equilibrium moisture content, wherein said±5 g/m² variation results from unavoidable variations in the coating operation+variations in the humidity, wherein the 1L-UD is stored. In the 1L-UD the Prinlin™ B7137 HV matrix material is distributed in spots on and between the filaments of the multifilament yarn.

b) Manufacture of a laminated cross-ply (2L-UD) from two 1L-UDs

Two 1L-UDs resulting from a) were cross-plied at a cross-plying angle of 90°. The cross-plied 1L-UDs were laminated by guiding said two cross-plied UDs with a velocity of 2 m/min through a mini flat belt laminator RPS-L 600K (Manufacturer: Maschinenfabrik Herbert Meyer GmbH, Germany) having a heating-zone followed by a pressing-zone and a cooling zone. In the heating-zone the cross-plied 1L-UDs were heated for 10 seconds at 120° C. In the pressing zone the heated cross-plied 1L-UDs were pressed at 35 N/cm² between pressure rollers and finally cooled to room temperature in the cooling zone for 8 seconds resulting in a laminated cross-ply from said two 1L-UDs, i.e., resulting in a 2L-UD. In this manner two 2L-UD cross-plies were manufactured.

c) Manufacture of a Laminated Cross-Ply (4L-UD) from Two 2L-UDs

The two 2L-UDs resulting from b) were cross-plied at a cross-plying angle of 90° to yield a stack with a 0°/90°/0°/90° cross-plying angle sequence. Said stack was laminated by guiding it with a velocity of 2 m/min through a mini flat belt laminator RPS-L 600K (Manufacturer: Maschinenfabrik Herbert Meyer GmbH, Germany) having a heating-zone followed by a pressing-zone and a cooling zone. In the heating-zone the two cross-plied 2L-UDs were heated for 10 seconds at 120° C., pressed in the pressing zone at 35 N/cm² between pressure rollers and finally cooled in the cooling zone for 8 seconds to room temperature resulting in a laminated cross-ply from said two 2L-UDs, i.e., resulting in a 4L-UD.

d) Manufacture of a Film-Coated 4L-UD

The 4L-UD cross-ply resulting from c) was simultaneously laminated on its front and rear surfaces each with one LDPE film of 10 µm thickness having a $T_m$ of 120° C. (Trade name LDPE Flachfolie; Manufacturer: EBK Kunststoffe GmbH, DE). For this purpose said 4L-UD cross-ply was laminated by guiding it together with two of said LDPE films with a velocity of 2 m/min through a mini flat belt laminator RPS-L 600K (Manufacturer: Maschinenfabrik Herbert Meyer GmbH, Germany) having a heating-zone followed by a pressing-zone and a cooling zone. In the heating-zone the 4L-UD cross-ply and the two LDPE films were heated for 10 seconds at 120° C., pressed in the pressing zone at 35 N/cm² between pressure rollers and finally cooled in the cooling zone for 8 seconds to room temperature resulting in a 4L-UD cross-ply coated on its front and rear surfaces each with one LDPE film. Said film-coated 4L-UD cross-ply exhibited a matrix material content of 17.2 wt.-% and an areal density of 243 g/m².

e) Manufacture of Ballistic Test Panels and Ballistic Evaluation 15 film-coated 4L-UD cross-plies obtained from d) were stacked in such a way that always a 0° oriented ply was adjacent to a 90° oriented ply. Then said stacked 15 film-coated 4L-UD cross-plies were fixated by stitching them at the corners. In said manner 3 test panels were manufactured. Each test panel had an areal density of about 3.6 kg/m².

Said 3 test panels were evaluated according to MIL STD 662F with respect to their $v_{50}$-value obtained with bullets (ammunition type: 0.357 Magnum, soft core, manufactured by Remington Arms Company, Inc.: 0° obliquity). The $v_{50}$-value is shown in table 1 as arithmetical average obtained from said 3 test panels together with its standard deviation.

In the same manner as described above, 3 test panels were manufactured however with the difference that each test panel contained 19 film-coated 4L-UD cross-plies. Each test panel had an areal density of about 4.6 kg/m².

Said 3 test panels were evaluated according to MIL STD 662F with respect to their $v_{50}$-value obtained with bullets (ammunition type: 9 mm DM41, soft core, manufactured by RUAG Ammotec, Switzerland; 0° obliquity). The $v_{50}$-value is shown in table 1 as arithmetical average obtained from said 3 test panels together with its standard deviation.

f) Abrasion Testing

A film coated 4L-UD cross-ply obtained from d) was tested for abrasion resistance (inflated diaphragm apparatus) per ASTM D3886-99 (Reapproved 2006) using Model CSI-59 Abrasion Tester from Custom Scientific Instruments. The abrasive surface was FCTWA1006160.01144 Woven Fabrics. The pressure was set to 4 psi with a 5 lbs load. After 2000 cycles, the film was worn off of the outer UD-layer and fibers of said outer UD-layer began to bundle. Fiber bundling was so intensive that the lower layer of the upper 2L-UD became visible.

EXAMPLE 1

I) Manufacture of a First and Second Powder Coated 2L-UD

A 2L-UD cross-ply was manufactured as described in a) and b) of comparative example 1. The 2L-UD cross-ply had a matrix material content of 17.5 wt.-% with respect to the weight of the yarn without moisture, as explained in a) of the comparative example.

On one of the surfaces of said 2L-UD cross-ply powder particles were distributed using a "PST scatter" powder coater (Manufacturer: Maschinenfabrik Herbert Meyer GmbH, Germany) with 2 to 4 g/m² Plascoat PECMA 160 powder obtained from Plascoat Europe, NL. Plascoat PECMA 160 powder is a high performance Low Density Polyethylene (LDPE) coating powder having $T_m$=107° C., a brittleness temperature determined according to ASTM D-748 of −40° C., a vicat softening point determined according to ISO 306 of 80° C., a melt flow index determined according to ASTM D1238 of 18-25 g/10 minutes, and a particle size distribution, wherein 100% of the particles exhibit a particle size<250 μm and at least 80% of the particles exhibit a particle size<160 μm.

Directly after the distribution of the powder particles the 2L-UD cross-ply with distributed powder particles thereon was guided with a velocity of 20 m/min through a flat belt laminator KFK-EL (Manufacturer: Maschinenfabrik Herbert Meyer GmbH, Germany) having a heating-zone followed by a pressing-zone and a cooling zone. In the heating-zone the powder particles containing 2L-UD cross-ply was heated for 5 seconds at 120° C., whereby the LDPE particles were partly molten on the powder coated surface to yield a 2L-UD cross-ply exhibiting partly molten LDPE-particles which did not contact one another. At this stage the partly molten LDPE-particles are in contact with the surface of the 2L-UD, but their adhesion with the surface of the 2L-UD is too low. Therefore, in the pressing zone the heated 2L-UD cross-ply containing the partly molten LDPE-particles was pressed between the pressure rollers at an adhesion increasing pressure $p_{ad}$ of 10 N/m² and thereafter cooled in the cooling zone for 4 seconds to room temperature resulting in a first 2L-UD cross-ply, in the following abbreviated with "first powder coated 2L-UD" containing partly molten and thereafter solidified LDPE particles on one of its surfaces, which particles exhibit an island-in-the-sea coating pattern on the powder coated surface. That means, that, when looked from above, the LDPE-coated regions look like islands distributed on the sea which is the non-coated, i.e., uncovered 2L-UD-surface. The islands do not contact one another. If looked from above the single islands exhibit either a spherical or an elliptical shape and exhibit a height having values below the diameter of the Plascoat PECMA 160 powder before powder coating.

In the same manner as described above, a second 2L-UD cross-ply was powder coated and laminated yielding a "second powder coated 2L-UD" containing partly molten and thereafter solidified LDPE particles on one of its surfaces exhibiting an island-in-the-sea coating pattern on the powder coated surface as described above for the first powder coated 2L-UD.

II) Manufacture of a Powder Coated 4L-UD Cross-Ply

Finally, the second powder coated 2L-UD was stacked onto the first powder coated 2L-UD to yield a stack wherein said first and second 2L-UDs contact one another on the non-powder coated surface so that said stack exhibits a powder coated front surface and a powder coated rear surface. In order to laminate said first with said second powder coated 2L-UD, the stack was guided with a velocity of 2 m/min through a mini flat belt laminator RPS-L 600K (Manufacturer: Maschinenfabrik Herbert Meyer GmbH, Germany) having a heating-zone followed by a pressing-zone and a cooling zone. In the heating-zone the stack was heated for 10 seconds at 120° C., pressed in the pressing zone at 35 N/cm² and finally cooled for 4 seconds in the cooling zone to room temperature resulting in a 4L-UD cross-ply containing on its front and rear surface partly molten and thereafter solidified LDPE particles, which particles form an island-in-the-sea coating pattern, in the following abbreviated with "powder coated 4L-UD cross-ply". That means, that, when looked from above, the LDPE-coated regions on the front surface and on the rear surface look like islands distributed on the sea which is the non-coated, i.e., uncovered 4L-UD front or rear surface, respectively. The islands do not contact one another and, if looked from above, the single islands exhibit either a spherical or an elliptical shape. The spherical shaped island have an arithmetically averaged diameter $d_s$ and the elliptical shaped island have an arithmetically averaged diameter $d_e$ obtained from arithmetically averaging the lengths of the long axes and of the short axes of the ellipses so that the islands, when looked from above, exhibit an average diameter $d_i=(d_s+d_e)/2$, and $d_i$ ranges from 100 to 1000 μm and when looked from the side, exhibit an arithmetically averaged height h, and h ranges from 5 to 50 μm.

In view of the 2 to 4 g/m² LDPE-powder which were applied for powder coating 15 to 65% of the 2L-UD surface was coated with LDPE-islands. So, the cover factor $f_c$ of the 2L-UD surface was in the range from 15 to 65%.

The powder-coated 4L-UD cross-ply exhibited a matrix material content of 17.5 wt.-% with respect to the weight of the yarn without moisture as explained in a) of the comparative example and an areal density of 231 g/m².

III) Manufacture of Ballistic Test Panels and Ballistic Evaluation 15 powder-coated 4L-UD cross-plies obtained from II) were stacked in such a way that always a 0° oriented ply was adjacent to a 90° oriented ply. Then said stacked 15 powder-coated 4L-UD cross-plies were fixated by stitching them at the corners. In said manner 3 test panels were manufactured. Each test panel had an areal density of about 3.5 kg/m².

Said 3 test panels were evaluated according to MIL STD 662F with respect to their $v_{50}$-value obtained with bullets (ammunition type: 0.357 Magnum, soft core, manufactured by Remington Arms Company, Inc.; 0° obliquity). The $v_{50}$-value is shown in table 1 as arithmetical average obtained from said 3 test panels together with its standard deviation.

In the same manner as described above 3, test panels were manufactured however with the difference that each test panel contained 19 powder-coated 4L-UD cross-plies. Each test panel had an areal density of about 4.4 kg/m² Said 3 test panels were evaluated according to MIL STD 662F with respect to their $v_{50}$-value obtained with bullets (ammunition type: 9 mm DM41, soft core, manufactured by RUAG Ammotec, Switzerland; 0° obliquity). The $v_{50}$-value is shown in table 1 as arithmetical average obtained from said 3 test panels together with its standard deviation.

TABLE 1

Lamination conditions and construction

| | Areal density of panel [kg/m$^2$] | v$_{50}$ tested with .357 magnum bullets [m/s] | Areal density of panel [kg/m$^2$] | v$_{50}$ tested with 9 mm DM41 bullets [m/s] |
|---|---|---|---|---|
| Comparative example 1 | 3.6 | 449 ± 12 | 4.6 | 482 ± 15 |
| Example 1 | 3.5 | 456 ± 12 | 4.4 | 502 ± 11 |

As can be seen in table 1, the panel of example 1, if tested with 0.357 Magnum bullets, exhibits v$_{50}$=456 m/s, i.e., a ballistic performance against bullets which is 1.6% higher than v$_{50}$=449 m/s of the panel of comparative example 1, though the panel of example 1 has a 2.8% lower areal density.

Furthermore, table 1 shows that the panel of example 1 if tested with 9 mm DM41 bullets exhibits v$_{50}$=502 m/s, i.e., a ballistic performance against bullets which is 4.1% higher than v$_{50}$=482 m/s of the panel of comparative example 1, though the panel of example 1 has a 4.3% lower areal density.

COMPARATIVE EXAMPLE 2

In the same manner as described in steps a)-d) of comparative example 1, 15 film-coated 4L-UD cross-plies were manufactured. Said 15 film-coated 4L-UD cross-plies were stacked in such a way that always a 0° oriented ply was adjacent to a 90° oriented ply. Then said stacked 15 film-coated 4L-UD cross-plies were fixated by stitching them at the corners. In said manner 2 test panels were manufactured. Each test panel had an areal density of about 3.6 kg/m$^2$.

Said 2 test panels were evaluated according to STANAG 2920 with respect to their v$_{50}$-value obtained with fragment simulating projectiles (ammunition type: 1.1 g FSP; 0° obliquity). The v$_{50}$-value is shown in table 2 as arithmetical average obtained from said 2 test panels together with its standard deviation.

COMPARATIVE EXAMPLE 3

In the same manner as in comparative example 2, two test panels were manufactured, however with the difference that each test panel contained 22 film-coated 4L-UD cross-plies. Each test panel had an areal density of about 5.3 kg/m$^2$. Said 2 test panels were evaluated according to STANAG 2920 with respect to their v$_{50}$-value obtained with fragment simulating projectiles (ammunition type: 1.1 g FSP; 0° obliquity). The v$_{50}$-value is shown in table 2 as arithmetical average obtained from said 2 test panels together with its standard deviation.

EXAMPLE 2

In the same manner as described in steps I)-II) of example 1, 15 powder coated 4L-UD cross-plies were manufactured. Said 15 powder coated 4L-UD cross-plies were stacked in such a way that always a 0° oriented ply was adjacent to a 90° oriented ply. Then said stacked 15 powder-coated 4L-UD cross-plies were fixated by stitching them at the corners. In said manner 2 test panels were manufactured. Each test panel had an areal density of about 3.3 kg/m$^2$. Said 2 test panels were evaluated according to STANAG 2920 with respect to their v$_{50}$-value obtained with fragment simulating projectiles (ammunition type: 1.1 g FSP; 0° obliquity). The v$_{50}$-value is shown in table 2 as arithmetical average obtained from said 2 test panels together with its standard deviation.

EXAMPLE 3

In the same manner as described in example 2, two test panels were manufactured however with the difference that each test panel contained 22 powder-coated 4L-UD cross-plies. Each test panel had an areal density of about 4.9 kg/m$^2$. Said 2 test panels were evaluated according to STANAG 2920 with respect to their v$_{50}$-value obtained with fragment simulating projectiles (ammunition type: 1.1 g FSP; 0° obliquity). The v$_{50}$-value is shown in table 2 as arithmetical average obtained from said 2 test panels together with its standard deviation.

TABLE 2

| | Areal density of panel [kg/m$^2$] | v$_{50}$ tested with 1.1 g FSP fragments [m/s] |
|---|---|---|
| Comparative example 2 | 3.6 | 467 ± 16 |
| Comparative example 3 | 5.3 | 550 ± 17 |
| Example 2 | 3.3 | 473 ± 17 |
| Example 3 | 4.9 | 563 ± 11 |

As can be seen, the panel of example 2 with 15 layers if tested with 1.1 g FSP ammunition exhibits v$_{50}$=473 m/s, i.e., a ballistic performance against fragments which is 1.3% higher than v$_{50}$=467 m/s of the panel of comparative example 2, though the panel of comparative example 2 has an 8.3% lower areal density.

The panel of example 3 with 22 layers if tested with 1.1 g FSP ammunition exhibits v$_{50}$=563 m/s, i.e., a ballistic performance against fragments which is 2.4% higher than v$_{50}$=550 m/s of the panel of comparative example 3, though the panel of example 3 has a 7.5% lower areal density.

EXAMPLE 4

I) Manufacture of a Powder Coated 2L-UD

A 2L-UD cross-ply was manufactured as described in a) and b) of comparative example 1. The 2L-UD cross-ply had a matrix material content of 17.5 wt.-% with respect to the weight of the yarn without moisture, as explained in a) of the comparative example.

On one of the surfaces of said 2L-UD cross-ply powder particles were distributed using a Powerline 100 Powder Coater Unit manufactured by Reliant Machinery. A weight of 20 to 30 g/m$^2$ of V1807 PVC Powder obtained from PolyOne (Georgia, US) was achieved due to the (add on)-limitations of the powder coater. V1807 PVC Powder is a low molecular weight polyvinyl chloride (PVC) homopolymer coating powder (molecular weight=50 K, i.e., 50 000) having T$_m$=160° and a particle size of approximately 200 microns. The data sheet of V1807 PVC Powder shows a typical value for the particle size of the powder determined according to ASTM D-1895 of 143 microns.

Directly after the distribution of the V1807 PVC powder particles, the 2L-UD cross-ply with said distributed powder particles thereon was guided with a velocity of 10 m/min through the IR section of the coater giving a surface temperature of 215° C. The PVC particles were partly molten on the powder coated surface to yield a 2L-UD cross-ply exhibiting partly molten PVC-particles with very little contact with each other. The material was then cooled to room temperature.

The PVC powder coated 2L-UD cross-ply obtained from this example was tested for abrasion resistance (inflated diaphragm apparatus) per ASTM D3886-99 (Reapproved 2006) using Model CSI-59 Abrasion Tester from Custom Scientific Instruments. The abrasive surface was FCTWA1006160.01144 Woven Fabrics. The pressure was set to 4 psi with a 5 lbs load. After 2000 cycles, the surface of the outer UD-layer showed only little change. No fiber bundling was observed and the lower layer of the upper 2L-UD remained invisible.

The invention claimed is:

1. A ballistic resistant article comprising at least one consolidated composite, wherein
   the at least one consolidated composite comprises at least two layers,
   each layer comprises a network of fibers,
   the fibers have a strength of at least 800 mN/tex (1100 MPa) according to ASTM D 7269-07,
   the fibers in each layer are impregnated with a matrix material, and
   each consolidated composite has a front surface and a rear surface,
   wherein
      at least the front surface of each consolidated composite is powder coated with partly molten and solidified powder particles to form a powder coated surface.

2. The ballistic resistant article according to claim 1, wherein the article comprises 2 to 100 consolidated composites.

3. The ballistic resistant article according to claim 1, wherein each consolidated composite comprises 2 to 10 layers.

4. The ballistic resistant article according to claim 1, wherein the network of fibers comprised by each layer is a woven fabric or a non-woven fabric.

5. The ballistic resistant article according to claim 4, wherein the non-woven fabric is a unidirectional aligned fiber layer.

6. The ballistic resistant article according to claim 1, wherein the fibers are aramid fibers.

7. The ballistic resistant article according to claim 1, wherein the matrix material comprises an organic polymer and the polymer is a styrene isoprene styrene block copolymer, a styrene butadiene random copolymer, a self-crosslinking acrylic polymer and/or a crosslinkable acrylic polymer or a polychloroprene polymer.

8. The ballistic resistant article according to claim 1, wherein a matrix material content in each layer and in each consolidated composite ranges from 5 wt.-% to 30 wt.-% with respect to the weight of the fibers without moisture, and an areal density of each consolidated composite ranges from 50 g/m$^2$ to 500 g/m$^2$.

9. The ballistic resistant article according to claim 1, wherein the powder particles consist of a thermoplastic polymer, wherein the thermo-plastic polymer is a member selected from one of the groups consisting of low-density polyethylenes (LDPE), linear low-density polyethylenes (LLDPE), high-density polyethylenes (HDPE) and polyvinyl chlorides (PVC).

10. The ballistic resistant article according to claim 1, wherein an areal density of the partly molten and solidified powder particles on a powder coated surface ranges from 0.1 g/m$^2$ to 50 g/m$^2$.

11. Process to manufacture a ballistic resistant article according to claim 1, wherein the process comprises the following steps:
   a) manufacturing at least one consolidated composite which comprises at least two layers, each layer comprises a network of fibers, the fibers have a strength of at least 800 mN/tex (1100 MPa) according to ASTM D 7269-07, and the fibers in each layer have been impregnated with a matrix material,
   b) powder coating at least one surface of the consolidated composite resulting from step a) with powder particles by
      (1) distributing the powder particles on the surface,
      (2) partly melting the distributed particles resulting from step b(1) on the surface, and
      (3) solidifying the partly molten particles resulting from step b(2) on the surface, and, if two or more composites have been manufactured in steps a) and b),
   c) stacking the two or more powder coated consolidated composites obtained in step b) and fixating the consolidated composites with one another by stitching them.

12. Process according to claim 11, wherein the operations (1), (2) and (3) have to be performed in a manner that ensures that an island in the sea coating pattern is obtained on the powder coated surface.

13. The ballistic resistant article according to claim 1, wherein the partly molten and solidified powder particles form an island in the sea coating pattern on the powder coated surface.

14. The ballistic resistant article according to claim 13, wherein the islands in the island-in-the-sea coating pattern do not contact one another, and, if looked from above, exhibit a spherical and/or elliptical shape.

15. The ballistic resistant article according to claim 14, wherein the spherical shaped islands have an arithmetically averaged diameter $d_s$ and the elliptical shaped island have an arithmetically averaged diameter $d_e$ obtained from arithmetically averaging the lengths of the long axes and of the short axes of the ellipses, so that the islands,
   when looked from above, exhibit an average diameter $d_i=(d_s+d_e)/2$, and $d_i$ ranges from 10 to 10000 µm, and
   when looked from the side, exhibit an arithmetically averaged height h, and h ranges from 0.5 to 1000 µm.

16. The ballistic resistant article according to claim 13, wherein the islands cover a fraction of the powder coated surface defined by a cover factor $f_c=\{(A_{covered}/(A_{uncovered}+A_{covered}))\}\cdot 100$ [%], wherein $A_{uncovered}$ denotes the uncovered area of the powder coated surface and $A_{covered}$ denotes the covered area of the powder coated surface, and $f_c$ ranges from 1% to 95%.

* * * * *